United States Patent [19]

Kordik

[11] Patent Number: 5,107,159
[45] Date of Patent: Apr. 21, 1992

[54] BRUSHLESS DC MOTOR ASSEMBLY WITH ASYMMETRICAL POLES

[75] Inventor: Jeffrey A. Kordik, Aptos, Calif.

[73] Assignee: Applied Motion Products, Inc., Scotts Valley, Calif.

[21] Appl. No.: 402,225

[22] Filed: Sep. 1, 1989

[51] Int. Cl.$^5$ .................... H02P 5/06; H02K 21/12; H02K 11/00; H02K 1/10
[52] U.S. Cl. .................... 310/156; 310/179; 310/186; 310/193; 310/67 R; 310/68 B; 318/138
[58] Field of Search .................. 310/67 R, 68 B, 156, 310/179, 180, 184, 186, 193, 191; 318/138, 254

[56] References Cited

U.S. PATENT DOCUMENTS

| | | | |
|---|---|---|---|
| 3,978,356 | 8/1976 | Spiesberger | 310/156 |
| 4,031,419 | 6/1977 | Spiesberger et al. | 310/49 R |
| 4,096,419 | 6/1978 | Wren et al. | 318/138 |
| 4,458,184 | 7/1984 | Kawate | 318/138 |
| 4,554,491 | 11/1985 | Plunkett | 310/186 |
| 4,672,253 | 6/1980 | Tajima | 310/156 |
| 4,700,098 | 10/1987 | Kawashima | 310/186 |
| 4,719,378 | 1/1988 | Katsuma et al. | 310/67 R |
| 4,739,203 | 4/1988 | Miyao et al. | 310/67 R |
| 4,769,567 | 9/1988 | Kurauchi et al. | 310/156 |
| 4,847,526 | 7/1989 | Takehara et al. | 310/67 R |

Primary Examiner—Steven L. Stephan
Assistant Examiner—C. La Balle
Attorney, Agent, or Firm—Michael J. Hughes

[57] ABSTRACT

A two phase unipolar brushless direct current motor with asymmetrically arranged pole positions including a rotor portion (12) mounted upon a shaft subassembly (14) and rotating therewith with respect to a stator portion (16). The rotor portion (12) includes a field magnet (22) which is divided into alternately polarized zones (26) and (28) which are of dissimilar sizes, and a commutator magnet (38) to provide for electrical timing. The stator portion (16) includes salient pole positions (44) which are asymmetrically arranged around the circumference of the stator core.

A latching hall effect sensor (82) is also provided to act as a commutator triggering element. The motor (10) is characterized in that the asymmetrical arrangement of its magnetic elements prevents there being a zero torque or a detent position. The primary usage of the motor (10) is in digital data storage devices.

4 Claims, 5 Drawing Sheets

BRUSHLESS DC MOTOR ASSEMBLY WITH ASYMMETRICAL POLES

TECHNICAL FIELD

The present invention relates generally to electrical motors and more particularly to brushless direct current (DC) electrical motors. The predominant current usage of the improved brushless DC motor assembly of the present invention is as a replacement for conventional brushless DC motors in various devices including those utilized in magnetic media disk drives in the data processing industry.

BACKGROUND ART

Brushless DC motors are an accepted staple of the electronics industry. This type of motor is commonly used in applications which require extended continuous high speed operation. Brushless DC motors are widely used in the data processing industry as drive motors in rotating media drives and in other applications.

The construction of brushless DC motors has long been known in the industry. These motors are constructed in many different phases and excitation modes. Two of the most common forms of brushless DC motors in the prior art are the three phase bipolar excitation type of motor and the two phase unipolar excitation type. An example of a three phase motor, exemplifying one of these types, is found in a patent entitled "Brushless DC Motor Assembly With Improved Stator Pole", U.S. Pat. No. 4,499,407 issued to Macleod.

Other examples of brushless DC motors incorporating conventional structures and associated circuitry may be found in U.S. Pat. No. 4,430,603 issued to Muller and U.S. Pat. No. 4,376,261 issued to von der Heide et al.

The three phase bipolar version the brushless DC motor is popular since it provides high performance characteristics. One of the most important and appreciated characteristics of the three phase bipolar type is the fact that it does not suffer greatly from a phenomenon known as torque ripple. Torque ripple is defined as the presence of positions in the rotation of a motor wherein there is either zero or very low torque in relation to the motor's peak torque. However, the three phase bipolar motor is disfavored in cost or space sensitive applications because, in addition to the fact that it requires relatively complex commutation logic and circuitry, this type of motor requires a minimum of six switching devices to achieve continuous motor rotation.

The two phase unipolar excitation type motor, an example of which may be found in U.S. Pat. No. 4,429,263, issued to Muller, is one of the simplest forms of operable motors. This type of motor requires two separate sets of stator windings and two switching devices, plus a single position sensor and commutation logic and circuitry. The two phase unipolar type of motor has, in prior art configurations, suffered from pronounced torque ripple characteristics. One of the undesirable effects of torque ripple is that the motor starting torque is very low relative to the running torque. This has posed a particular problem for makers of data disk drives in that high starting torque is desirable, but running torque is intentionally limited.

Further, most prior art designs of the two phase unipolar brushless DC motor have not been inherently self starting. There are positions in the rotational axis of these motors from which either zero or minimal torque is produced, and from which the motor cannot generate sufficient torque to begin rotation. These positions are known as detent positions. Solutions to this problem in the prior art have involved schemes to prevent or discourage the motor from coming to rest in one of these detent positions. An example of this type of motor can be seen in the U.S. Pat. No. 4,499,407 issued to Macleod.

The Macleod invention utilizes an intentionally "out of phase" torque to eliminate zero torque positions. This high out of phase torque (cogging torque) is undesirable in operating modes other than start up, as the magnitude of this cogging torque is invariant with speed, thus causing high speed torque ripple and vibration in the application.

No prior art method is presently known for providing a two phase unipolar excitation brushless DC motor which can produce a significant portion of its maximum torque from any position in its rotation; while maintaining relatively low levels of cogging torque.

DISCLOSURE OF INVENTION

Accordingly, it is an object of the present invention to provide a brushless DC motor which provides a constant positive torque during its entire period of rotation.

It is another object of the present invention to provide a DC motor which is physically similar to and can replace prior art motors.

It is a further object of the invention to provide a motor which is inherently self starting in that there is no position from which it does not generate a significant rotational motive force.

It is another object of the invention to provide a motor that can be started under load from any rest position.

It is yet another object of the invention to provide a motor with a minimum starting torque which is not dissimilar from its maximum running torque.

It is yet another object of the invention to provide a motor which runs smoothly at high speed without imbalance or torque ripple.

The present invention relates to an improved brushless DC motor assembly incorporating an asymmetrical rotor magnet and stator pole positioning to reduce torque ripple. The present invention is particularly adapted for applications where sensitivity to the torque ripple of alternative designs is objectionable. The improved motor assembly is intended to be predominantly used as the rotational power source in disk drive assemblies.

Briefly, a preferred embodiment of the present invention is an improved brushless DC motor assembly of the two phase unipolar excitation type, including a rotor portion, a stator portion, a shaft portion and electrical control circuitry. The rotor portion includes a cylindrically shaped case and two permanent ring magnets, each divided into eight alternately polarized zones. The ring magnets include a field magnet which is radially polarized and a commutator magnet which is axially polarized. The rotor portion is rigidly connected to the shaft such that the shaft and rotor rotate together about the axis of the shaft with relation to the stationary stator portion. The stator portion includes a stator core with eight salient pole projections each having electromagnetic windings. A hall effect sensor is affixed to the nonrotating portion of the motor in a position where it can be affected by the magnetic fields of the commutator magnet. The electrical power and control apparatus provide conventional two-phase electrical signals to the stator windings in order to induce rotation of the rotor by magnetic attraction.

In the most preferred embodiment, the stator core is formed of a magnetically permeable material, and small inner poles are placed intermediate to the adjacent stator poles. These inner poles are provided as a means of distributing the magnetic field of the rotor magnets when the motor is at rest and thus further eliminating any tendency toward a detent position.

It is an advantage of the present invention that torque ripple is minimized by the fact that the rotor is being pulled by a positive magnetic attraction from the stator at all positions of the rotor.

It is another advantage of the present invention that smooth torque characteristics are provided with the use of minimal electronic circuitry.

It is a further advantage of the present invention that there is no rest position from which a magnetic attraction in the forward rotating direction is not produced between the rotor field magnets and the stator electromagnets; thus the motor is inherently self starting.

It is yet another advantage of the present invention that its starting torque is very similar to its running torque.

These and other objects and advantages of the present invention will become clear to those skilled in the art in view of the description of the best presently known mode of carrying out the invention and the industrial applicability of the preferred embodiment, as described herein and as illustrated in the several figures of the drawing.

BEST MODE FOR CARRYING OUT THE INVENTION

The best presently known mode for carrying out the invention is a brushless DC motor constructed such that the magnetic elements are arranged asymmetrically. This motor uses relatively simple and inexpensive two phase drive circuitry, yet it does not suffer a zero torque point in its rotation as do prior art two phase motors. The predominant expected usage of the inventive motor is in the data processing industry, particularly in magnetic media disk drives wherein a smooth torque curve is highly desirable.

Figure 1:
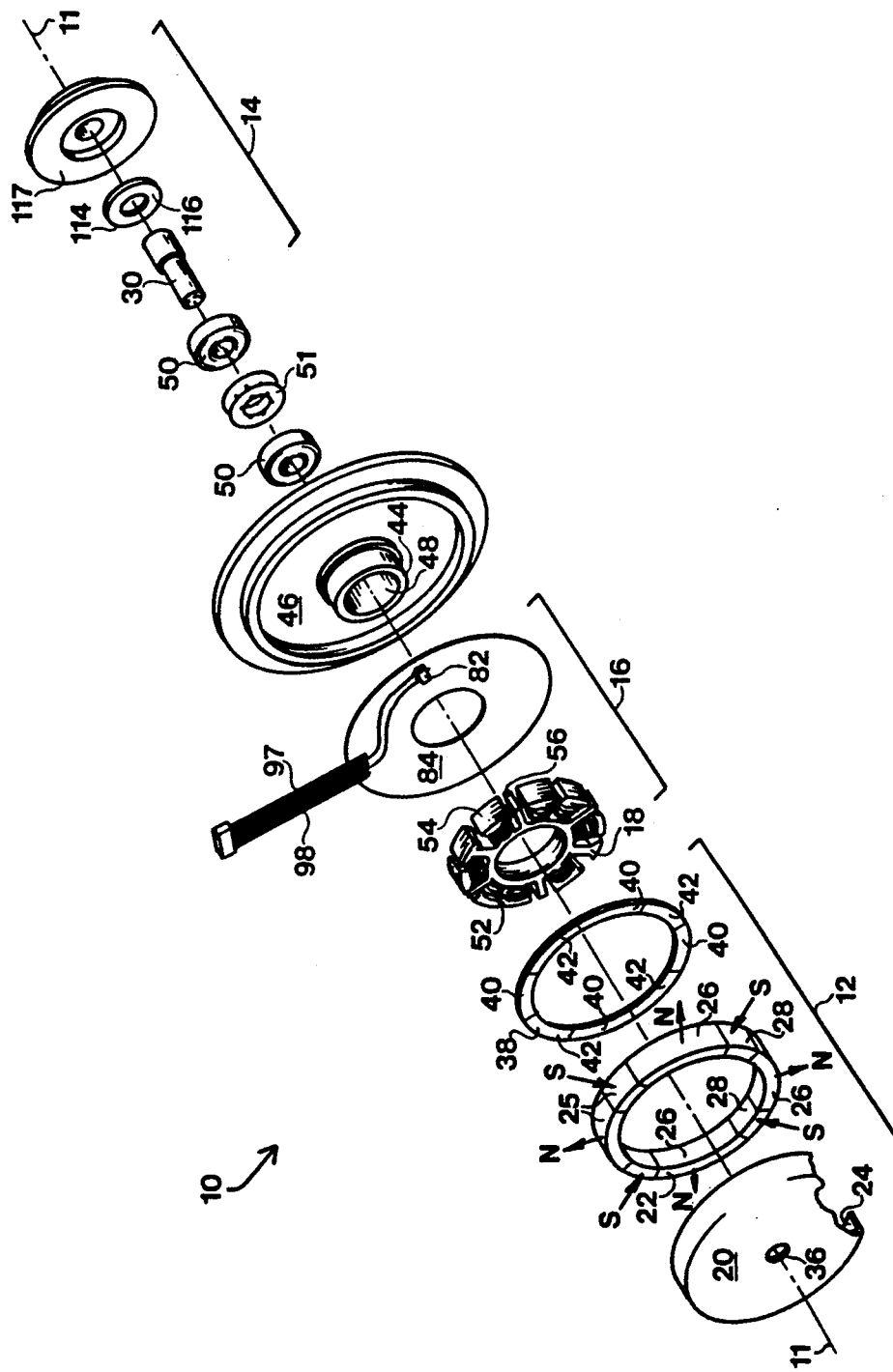
FIG. 1 is a exploded perspective view of a preferred embodiment of an improved brushless direct current electrical motor assembly according to the present invention.

The two phase brushless DC motor with asymmetrical magnet locations of the presently preferred embodiment of the present invention is illustrated in an exploded perspective view in FIG. 1 and is designated therein by the general reference character 10. In many of its substantial components, the motor 10 does not differ significantly from conventional brushless DC motors.

The motor is generally symmetrical about a rotational axis 11 and is comprised of a rotor assembly 12, a driveshaft assembly 14, and a stator assembly 16, the main component of which is a stator core 18. The rotor assembly 12 is affixed to the drive shaft assembly 14 and rotates about the axis 11. The stator assembly 16 remains stationary in relation to the surface upon which it is mounted. The rotor assembly 12 and the drive shaft assembly 14 rotate coaxially about the axis 11 in relation to the stator assembly 16.

The rotor assembly 12 includes a rotor shell 20, also referred to as a rotor cap. The rotor shell 20 is in the form of a cylinder enclosed at one end and open at the other. A rotor main field magnet assembly 22 is secured to the interior surface of the rotor shell 20 by an adhesive 24. The rotor magnet 22 is divided into eight distinct polar zones 25 or poles and these are comprised of four North poles 26 and four South poles 28. The zones 25 of the rotor magnet 22 are radially polarized with adjacent zones 25 being polarized in opposite directions and with alternate zones 25 being polarized in the same radial direction. Those zones 25 which are polarized such that conventional annotation would depict the lines of the flux emanating radially inward from the surface of the magnet 22 are designated as North poles 26. The oppositely polarized zones 25 are designated as South poles 28.

In the preferred embodiment the North poles 26 each occupy 60 degrees of arc. The south poles 28 each occupy 30 degrees of arc. Thus, the North poles 26 are twice as long as the South poles 28. While North poles 26 and South poles 28 of different proportional sizes could be made workable, North poles 26 of 60 degrees and South poles 28 of 30 degrees provided optimum efficiency for a device with the number of poles 26 and 28 as depicted in the preferred embodiment of the motor 10. The 60 degree and 30 degree relationship positions the resultant torque curves (shown as 134 and 140 of FIG. 10) such that there is no position of the rotation of rotor assembly 12 wherein no torque is being produced and also such that the positions of rotor 12 wherein torque is being produced by the action of more than one set of poles occur at regular intervals as the rotor 12 turns. The torque curves produced by the motor 10 will be discussed in more detail hereinafter in relation to FIG. 10.

The rotor poles 26 and 28 are typically permanent magnets having magnetic field strength selected dependent on the required force output of the motor. The rotor magnet 22 may be integrally constructed with pole sectors 26 and 28 formed therein or may be an aggregation of distinctly formed pole elements as shown.

One embodiment of the drive shaft assembly 14 includes a rigid cylindrical shaft member 30 which mates with a hole formed in the rotor shell 20. The shaft member 30 is secured to the rotor shell 20 by means of a press fit combined with appropriate cylindrical bonding adhesive 36.

The preferred embodiment of the present invention incorporates a commutator magnet 38 as well as the rotor field magnet 22. The commutator magnet 38 may be constructed by any of the same means as the field magnet 22. The commutator magnet 38 is divided into eight zones 39 of which four are axially polarized as North poles 40 and four are polarized as South poles 42. It is noted that the frame of reference is different from that used in connection with the rotor poles 26 and 28, due to the perpendicular nature of the polarization. The North poles 40 and South poles 42 of the commutator magnet assembly 38 are all of the same size, each occupying 45 degrees of arc within the inner circumference of the rotor cap 20 The poles are arranged such that commutator magnet North poles 40 alternate with the commutator magnet South poles 42. The commutator magnet 38 is affixed within the rotor cap by adhesive 24 in the same manner as the rotor field magnet 22. The commutator magnet 38 may also be affixed directly to or formed as a part of the rotor magnet 22.

In the preferred construction of motor 10 the commutator magnet 38 differs from the rotor field magnet 22 also in that the commutator magnet 38 is polarized parallel to the axis of rotation 11, whereas the zones 25 of the rotor field magnet 22 are polarized radially, or roughly perpendicular to the axis 11. The zones 25 of the commutator magnet 38 are of a lesser magnetic moment than are the zones 25 of the field magnet 22.

The stator assembly 16 generally refers to those elements which remain stationary with respect to the rotor assembly 12 and the shaft assembly 14. A mechanism for causing the stator core 18 to remain stationary while the rotor assembly 12 and driveshaft assembly 14 are allowed to rotate is the incorporation of a stator attachment extension 44 which is a part of a baseplate 46. The base plate 46 is of any of a wide variety of designs and may indeed be the frame of whatever component the motor is being utilized to power. The entire stator assembly 16 is affixed to the baseplate 46 to provide a stationary anchoring location. The stator attachment extension 44 is hollow and an aperture 48 is provided in the base plate 46 to allow passage of the shaft 30. Two mounting bearings 50 are provided within the baseplate 46 to facilitate the rotation of the shaft 30. In the preferred embodiment of the invention, slotted Belleville springs 51 are used to place a preload force on the bearings 50.

In the preferred embodiment 10 it has been found to be desirable to attach the stator assembly 16 is the baseplate 46 in such a manner that the stator assembly 16 is effectively mechanically isolated therefrom. This is accomplished by adhering the stator attachment extension 44 to the baseplate 46 utilizing "RTV", a silicon rubber material which acts both as an adhesive and as a "shock mount". Improved performance characteristics have been observed as a result of such shock mounting of the stator.

Figure 2:
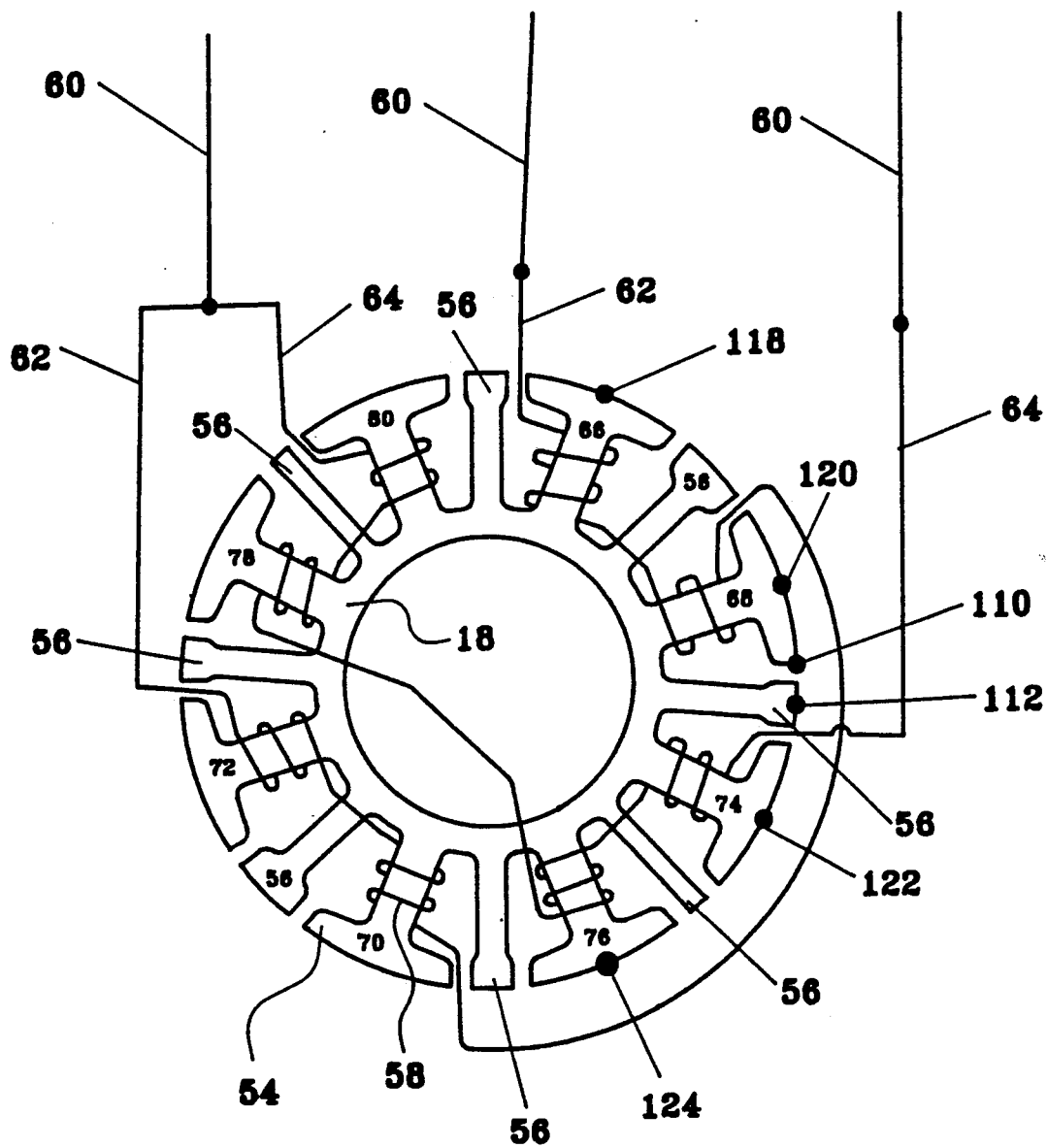
FIG. 2 is a diagram of the preferred motor stator showing the pattern of the coil windings.

The electrical and magnetic portion of stator assembly 16 is, in the preferred construction, made of a laminated series of plates bonded together to form the stator core 18. Using this type of construction, the core 18 is commonly referred to as a lam stack 52. The core 18 is shaped, in the preferred construction, as shown in FIG. 2 and is formed with eight salient stator poles 54. Between each of the poles in this construction is a smaller innerpole 56. In the preferred construction, the material of the stator core 18 has limited electrical conductivity and high magnetic permeability but is not permanently magnetic. An alternate construction in which a non-magnetically permeable alternative to the lam stack 52 is utilized and the innerpoles 56 are not required, is discussed hereinafter with respect to FIG. 3.

Each of the eight stator poles 54 is wound with a stator pole winding 58. Four of the stator pole windings 58 are wound in series with each other, while the other four stator pole windings 58 are also wound in series. Thus, there are two sets of series wound stator pole windings 58 which are connected to the external circuitry by means of three stator winding leads 60. Each of the winding sets is supplied by a direct current signal of equal magnitude. However, only one of the two current signals is operative at a given instant. In this type of motor, these currents are commonly designated as phase A and phase B. The voltages driving these currents may be of the same or of opposite polarities, the relative winding directions of the coils being affected accordingly.

The relative arrangement of the stator poles 54 and stator windings 58 is depicted by FIG. 2. A single wire 62 is wound around the first phase A North pole 66 such that the outward end of the pole 66 is polarized as a North magnetic pole when phase A current is applied. The same wire 62 then continues to the first phase A South pole 68 where it is wound in the opposite direction so as to make that pole 68 a South magnetic pole when phase A current is applied. The same wire 62 then continues to the second phase A North pole 70 where it is wound around that pole 70 so as to make it a North pole when phase A current is applied. Finally, that same wire is wound around the second phase A South pole 72 so as to make that pole 72 a South pole when phase A current is applied.

The second coil winding wire 64 is similarly arrayed to run initially to the first phase B North pole 74, then to the first phase B South pole 76, then to the second phase B North pole 78, and finally to the second phase B South pole 80. At each of these poles 74 through 80 the wire is wound in the appropriate direction such that, when current is applied the poles will be polarized in the correct radial direction when phase B current is applied.

A latching hall effect sensor 82 is affixed to the stator assembly 16. It is attached to the motor baseplate 46 by means of a printed circuit board 84. The hall effect sensor 82 is positioned axially opposite the commutator magnet 38 so that it is affected primarily by the magnetic field of the commutator magnet 38 and to a substantially lesser degree by the field of the rotor field magnet 22. The printed circuit board 84 is mounted so as to position the hall effect sensor 82 in line with the axially polarized commutator magnet 38 so that when both a North pole 26 of the field magnet and a South pole 42 of the commutator magnet 38 are rotationally over the hall effect sensor 82, the magnetic field at the sensor is affected by the fields of both the field magnet North pole 26 and of the commutator magnet South pole 42.

Figure 4:
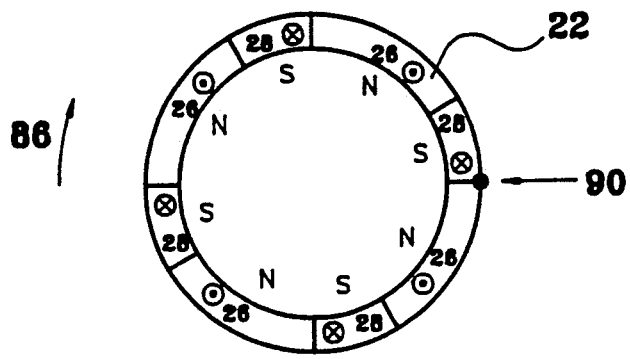
FIG. 4 is a diagram of the zones of polarization of the rotor field magnet.
Figure 5:
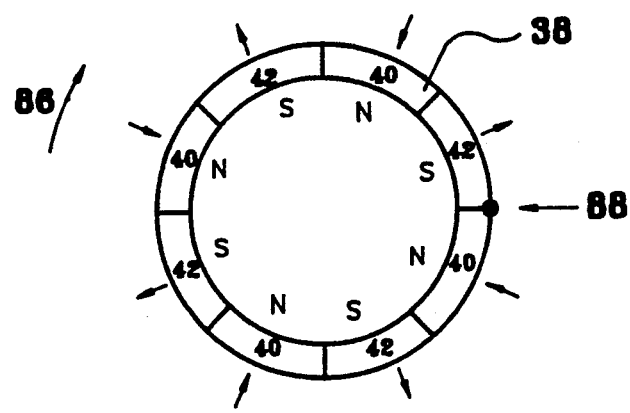
FIG. 5 is a diagram of the zones of polarization of the rotor commutator magnet.

The relative rotational alignment of the commutator magnet 38 to the field magnet 22 is illustrated in FIGS. 4 and 5 which are shown in the same frame of reference.

In these illustrations the intended direction of rotation of the field magnet 22 and the commutator magnet 38 is indicated by arrow 86. The commutator magnet 38 (FIG. 5) is to be positioned such that the reference point 88 on the commutator magnet 38 is rotationally aligned with reference point 90 on the rotor field magnet 22 (FIG. 4).

Figure 6:
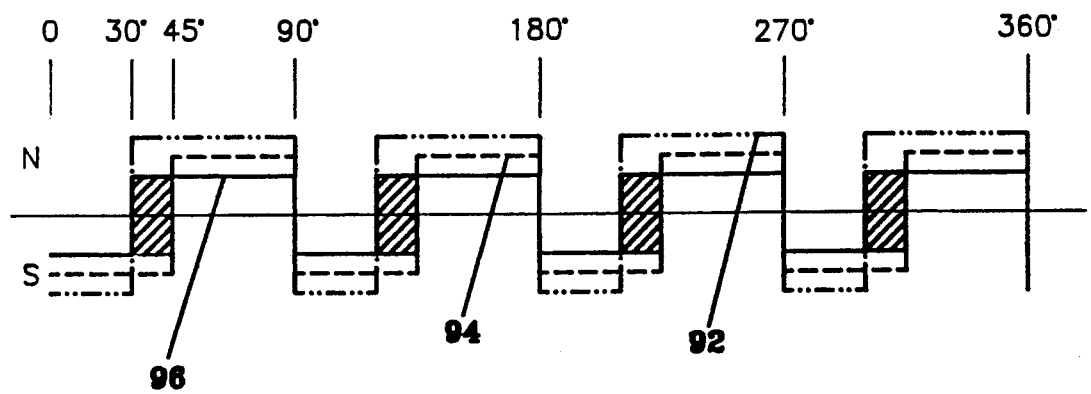
FIG. 6 is a graphical illustration of the flux fields present at the hall effect sensor as a function of the rotational position of the rotor assembly.

FIG. 6 illustrates the effect of this alignment on the field at the latching hall effect sensor 82 as the rotor assembly 12 is rotated 360 mechanical degrees. In this illustration the polarity of the magnetic fields is shown as a function of the physical position of the rotor. The effect of the rotor field magnet 22 on the magnetic field at the hall effect sensor 82 is depicted by a dotted line and is designated by the reference number 92. The effect of the commutator magnet 38 on the magnetic field at the hall effect sensor 82 is shown by a dashed line and is designated by the reference numeral 94. The combined effect of both fields at the hall effect sensor 82 is shown by a solid line and is indicated by the reference numeral 96. The latching hall effect sensor 82 is considered to be on when the hall effect sensor lead 98 is effectively shorted through the hall effect sensor 82 to the hall effect input lead 99. The hall effect sensor is considered to be off when there is no circuit path through the hall effect sensor 82 from the sensor lead 98 to the hall effect input lead 99. The nature of the latching hall effect sensor 82 is such that it turns on when it is placed in a cumulative magnetic South field and will remain on until the cumulative field is clearly reversed to North. Therefore, the net effect is that when the rotor assembly 12 is turned in the direction indicated by arrow 86 the latching hall device is on when it is subjected to the field of a commutator South pole 42, and it is off when it is subjected to the field of a commutator North pole 40. This same result could be obtained by placing the hall effect sensor 82 where it could be affected exclusively by the commutator magnet 38 and not the field magnet 22. Although the array field effects from the perpendicularly polarized main field magnet 22 are minimized by the polarization direction and by the location of the hall effect sensor 82 there is still some interference. A standard hall effect sensor could be used instead of the latching hall effect sensor 82. However, this would require moving the commutator magnet 38 out of the field of interference of the field magnet 22 in order to completely eliminate interference problems. This would be less than desirable because that construction would significantly increase the necessary size and/or cost of the device.

Figure 7:
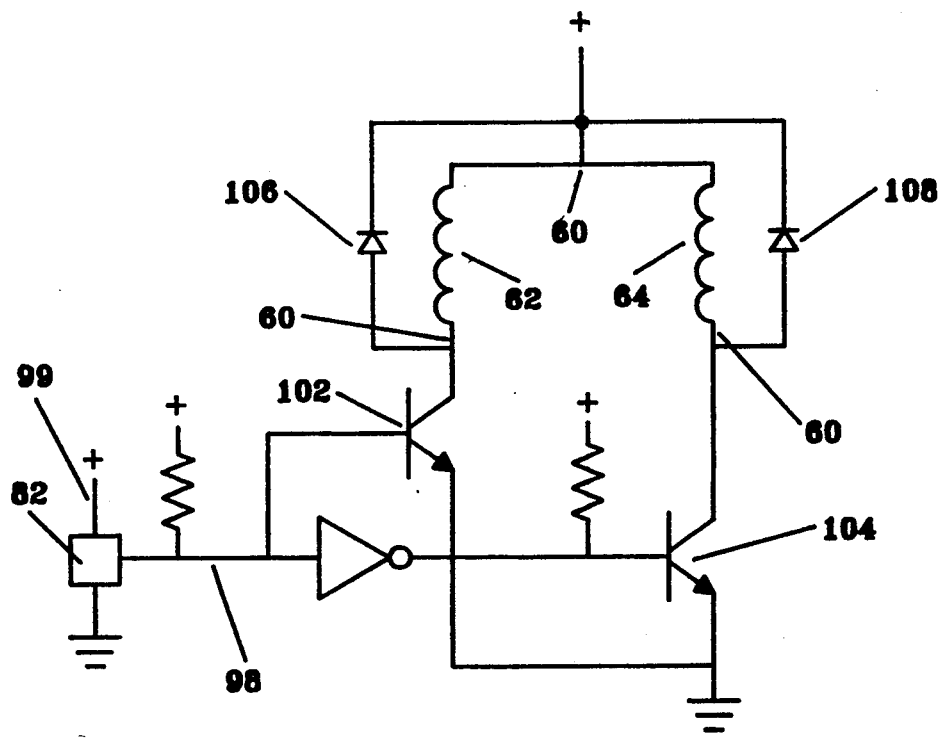
FIG. 7 is a schematic diagram of typical electrical control circuitry of the present invention.

A typical array of electrical control circuitry 100 necessary to operate the preferred embodiment of the motor 10 is illustrated in a schematic fashion in FIG. 7. As illustrated in FIG. 7, the stator winding control circuitry 100 includes the coil windings formed by the two coil winding wires 62 and 64 which are connected to the rest of the circuitry by the three stator winding leads 60. The control circuitry 100 also includes the latching hall effect sensor 82 which is connected to the rest of the circuitry by the hall effect sensor lead 98. In addition, the control circuitry includes a first transistor 102, a second transistor 104, a first diode 106, and a second diode 108. The first transistor 102 is arranged so that it supplies power to phase A coil wires 62 when the hall effect sensor 82 is in the off mode and does not supply power to coil wire 62 when the hall effect sensor is in the on mode. The second transistor 104 is arranged so that it supplies power to phase B coil wire 64 when the hall effect sensor is in the on mode, and does not supply power to coil wire 64 when the hall effect sensor 82 is in the off mode. Thus either phase A power is supplied to coil wire 62 or phase B power is supplied to coil wire 64 at all times. Phase A power and phase B power are never applied simultaneously.

Whether phase A or phase B power is being applied is determined by the on or off status of the hall effect sensor 82, and the on or off status of the hall effect sensor 82 is itself determined by the rotational position of the rotor assembly 12.

The hall effect sensor 82 is positioned opposed to the commutator magnet 38 such that, depending upon the rotational position of the rotor assembly 12, the correct coil wire (either 62 or 64) will be energized such that the field magnet 22 will be drawn by magnetic attraction toward the energized windings. A reference point of zero degrees is shown on the schematic coil winding diagram of FIG. 2 and is designated by the reference number 110. The hall effects sensor 82 is positioned, in the preferred embodiment of this invention, at negative 7.5 degrees in relation to this reference point. This relative position of the hall effect sensor 82 is designated by the reference number 112. Other alternative locations of the hall effect sensor 82 are possible.

Since when power is supplied to the external circuitry 100 either phase A current or phase B current is always flowing, and since the asymmetrical arrangement of the field magnet 22 and the stator assembly 16 assures that there is no position from which a positive torque cannot be generated by the magnetic attraction of the rotor magnet 22 toward one or more of the stator poles 54, the motor 10 is entirely self starting from any position.

The North magnetic fields are larger in the motor 10 than are the South magnetic fields. There is a tendency for flux leakage from the North magnetic fields and it is desirable to provide a means to inhibit this flux leakage. Therefore, a conventional magnetic fluid seal 114 is fitted on the motor 10 with the seal magnetic North pole 116 facing in toward the field magnet 22 to repel stray flux by magnetic repulsion. The fluid seal 114 is ordinarily required in most applications in any case as a barrier against contamination. The preferred embodiment of the invention also has a disk hub 117 for transferring the rotational power of motor 10 to a magnetic media disk in the intended application. Of course, were the inventive motor 10 to be employed in another application, the disk hub 117 could be easily replaced with any other sort of drive seal.

Figure 3:
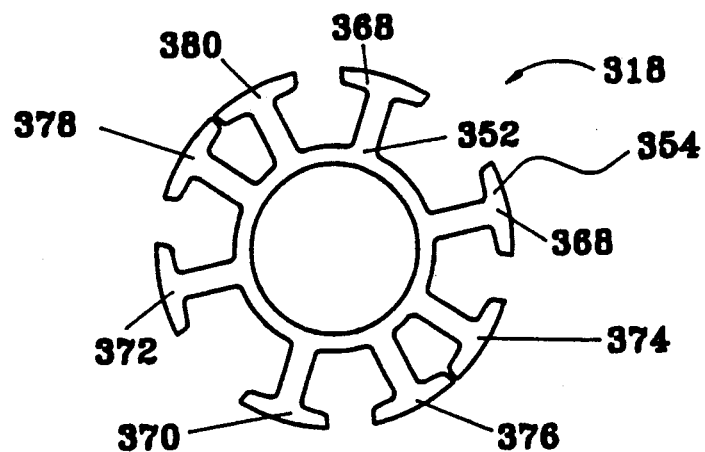
FIG. 3 is a plan view of the stator core showing an alternate preferred construction layout.

An alternate preferred embodiment of the present invention is identical to the preferred motor 10 in all respects except for the material and construction of the stator core 18. For clarity in designating the elements of the alternate embodiment, those elements which correspond to the elements of the preferred embodiment of the motor 10 will be designated by the same reference numeral as before except that 300 will be added to the numeral. The stator 18 used in the preferred embodiment of the invention is shown in FIG. 2 and has been discussed above. FIG. 3 is a plan view of the alternate stator 318 used in the alternate preferred embodiment 310.

One of the differences between the stator core 18 of the preferred embodiment 10 of this invention and the stator core 318 of the alternate preferred embodiment is that stator core 18 is made of a magnetically permeable material which provides a path for the flux of the rotor field magnet 22 even when the motor 10 is not powered. Using that type of material, it is desirable to include the innerpoles 56 in the design to distribute the field when the motor 10 is not in operation to avoid the tendency of the rotor assembly 12 to pull itself to a detent position, from which position the initial starting torque would be reduced. In the alternate preferred construction, the stator core 318 is made of any relatively magnetically nonpermeable material, such as a hard plastic, which can withstand the physical stresses and operational temperatures of the motor 10. The stator core 318 of the alternate preferred construction need not include the innerpoles 56 as are furnished on the stator core 18 of the preferred construction motor 10 since there is no residual magnetism in the core 352 because the materials are not ferromagnetic in nature. The stator poles 354 of the alternate stator core 318 are similar in shape and spacing to the stator poles 54 of the stator core 18 used in the preferred embodiment. Other constructions of the stator core 18 are possible, including the complete elimination of salient poles and substitution of coil windings correctly placed around a ring shaped core.

The correct positioning of the stator poles 54 on the preferred embodiment of the stator core 18 of this invention or of the stator poles 318 of the alternate preferred embodiment is a function of more than just the mechanical alignment of the stator poles 54 or 354 in relation to the rotor field magnet poles 26 and 28. It has been taken into consideration in the design of motor 10 that, since the North magnetic poles 26 of rotor field magnet 22 are much larger than the South magnetic poles, the magnetic flux is not symmetrically distributed around the junction of the North poles 26 and the South poles 28. The magnetic field around these poles is in fact skewed approximately 5 degrees toward the North magnetic pole 26. Because of this, motor 10 is made more efficient in actual operation by placing the phase A poles 66, 68, 70 and 72 ten degrees closer to the adjacent phase A pole than would be dictated by the relative physical positional relationships of the stator poles to the junctions of the rotor field magnet North poles 26 and 28. For the same reason, phase B stator poles 74, 76, 78, and 80 are moved ten degrees farther from the adjacent phase B pole in the actual construction of the preferred embodiment of this invention. The positioning of the stator pole projections 54 as used in the actual construction of motor 10 are depicted in FIG. 2. The center point 118 of phase A North pole 68 is located at −80 degrees relative to zero degree reference point 110. The center point 120 of phase A South pole 68 is located at −10 degrees relative to point 110. The center point 122 of phase B North pole 74 is located at +35 degrees relative to point 110. The center point 124 of phase B South pole 76 is located at +55 degrees relative to point 110. Since the stator core 18 is diametrically symmetrical, all pole projections 54 are exactly 180 degrees opposed to the opposite pole projection 54.

Figure 8:
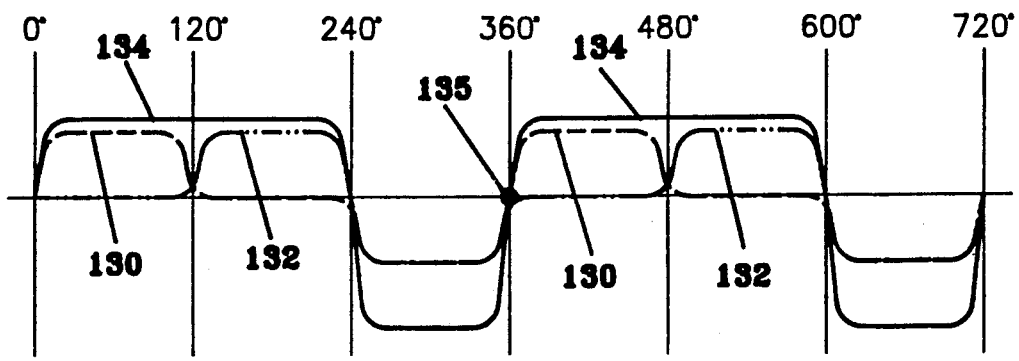
FIG. 8 is a graphical illustration of the magnetic torque factors produced by the phase A coil windings of the present invention.

FIG. 8 illustrates the torque produced by the phase A portion of the current flow as supplied by the phase A first transistor 102. The dashed line represents the torque produced by the phase A North coil windings of stator poles 66 and 70 and is indicated by the reference number 130. The dotted line represents the torque produced by the phase A South windings of stator poles 68 and 72 and is indicated by the reference numeral 132. The solid line represents the cumulative torque produced by the combined effect of all phase A coil currents, and is indicated by the reference numeral 134.

The point marked with the reference numeral 135 marks the completion of one electrical cycle or 360 electrical degrees. An electrical cycle is completed during the interval between the instant when the electrical field at the hall effect sensor 82 changes from North to South and the next such occurrence. There are four electrical cycles per physical revolution of the rotor assembly 12 in the preferred embodiment 10 of this invention since there are four sets of poles.

Figure 9:
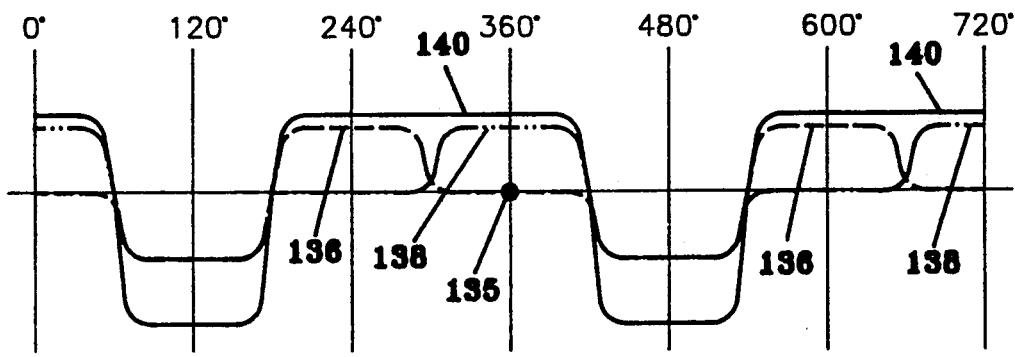
FIG. 9 is a graphical illustration of the magnetic torque factors produced by the phase B coil windings of the present invention.

FIG. 9 illustrates the torque produced by the phase B portion of the current flow as supplied by phase B second transistor 104. The dashed line represents the torque produced by the phase B North coil windings of stator poles 70 and 78 and is indicated by the reference number 136. The dotted line represents the torque produced by the phase B South windings of stator poles 72 and 80 and is indicated by the reference numeral 138. The solid line represents the cumulative torque produced by the combined effect of all phase B coil currents, and is indicated by the reference numeral 140. The point marked by reference numeral 135 again represents one complete electrical cycle.

Figure 10:
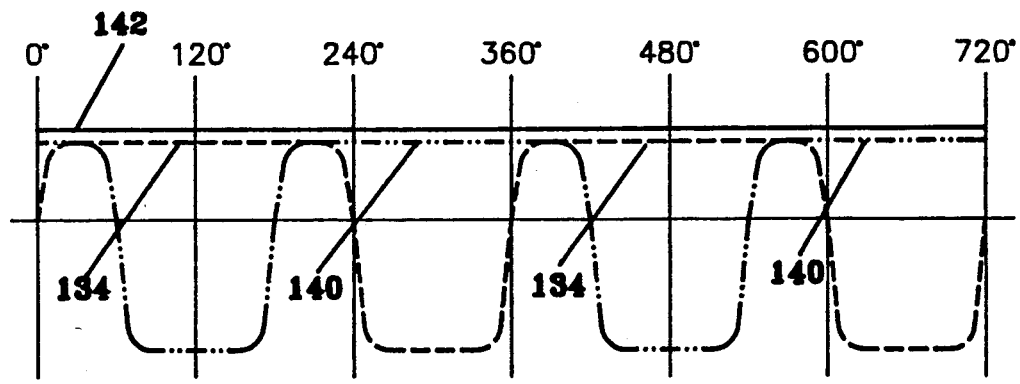
FIG. 10 is a graphical illustration of the cumulative magnetic torque characteristics of the present invention.

FIG. 10 illustrates the cumulative torque produced by both the phase A and phase B portions of the motor 10. The dashed line represents phase A torque curve 134. The dotted line represents phase B torque curve 140. The solid line represents the total cumulative torque output and is designated by reference numeral 142. Because the cumulative effect of torque curves 134 and 140 is positive along the entire period of rotation of rotor assembly 12, the cumulative torque curve 142 does not dip to zero torque at any portion of the rotational cycle.

As is shown above, in great part, the motor 10 greatly resembles prior art conventional motors in its components. The substantial difference exists in the placement of the magnetic components such that there is a continuous application of magnetic attractive force in the forward rotational direction at all positions of the rotor assembly 12.

It is anticipated that the stator core will be constructed of materials and formed as described herein for either stator core 18 or stator core 318. However, since the present invention is not dependent upon the materials or the shape of these portions, any of a wide variety of materials or shapes could be utilized within the anticipated scope of this invention. Similarly, the commutator magnet 38 of the present invention need not be affixed to the rotor shell 20 as described in the preferred embodiment of the invention. The commutator magnet 38 could be affixed by and means to cause it to rotate with the rotor assembly 12. Indeed, the commutator magnet 38 could be formed by polarizing different zones of the same structure as is used to create the field magnet 22.

Various modifications may be made to the invention without altering its value or scope. For example, the preferred embodiment has been described above in terms of a motor in which the main field magnet is situated in the rotor and the windings are on the stator. Although it is probably not commercially feasible, there is no reason that these functions could not be interchanged without adversely affecting the improvement created by the present invention. Similarly, the rotor is shown as the exterior member of the motor 10, but this could easily be altered such that the rotor is the central member and the stator is located around the outside.

Another conceivable change is in the type of polarities utilized. The motor illustrated uses radial polarities of the magnetic fields to generate the rotation. The concepts described above as being part of the invention would be equally effective in an axially polarized motor. Another element which may be easily changed without adversely affecting the performance of the motor is the number of poles utilized. The preferred embodiment 10 has been shown as having eight poles. However the substitution of any motor construction having N number of poles where N/4 is an integer would be effective. Indeed, such a motor could be constructed with any even number of physical poles by combining the electrical properties of two adjacent stator poles in one physical structure.

Another conceivable change is that the polarities could be reversed such that, with other appropriate changes, the rotor South poles 28 could be made larger than the rotor North poles 26.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The improved brushless DC motor assembly of the present invention is adaptable to any usage in which conventional DC motors are currently used. The particular use for which the improved motor assembly is developed was for use in disk drive units. Makers of disk drive units have expressed a need for motors that can produce more even starting torque without increasing running torque.

The present invention, since it exhibits smooth torque characteristics throughout its speed range, may well find use in any of a number of motor drive applications where smooth torque characteristics are required. Currently, three phase motors, which are more expensive to construct and require much more external control circuitry, are commonly used in these applications.

For these and other reasons, it is expected that the utility and industrial applicability of the invention will be both significant in scope and long-lasting in duration.

I claim:

1. A brushless direct current electric motor, comprising:
    a rotor portion including a field magnet assembly circumferentially divided into a plurality of adjacent alternately magnetically polarized zones including a number of North polarized zones and an equal number of South polarized zones, said radially polarized zones being of effective magnetic sizes such that all of said North polarized zones are of equal size, and all of said South polarized zones are of equal size, but said North polarized zones are of a size different from that of said South polarized zones;
    a stator portion including a stator core assembly comprising a plurality of asymmetrical arranged pole portions and a plurality of magnetic windings wrapped thereabout, said pole portions being positioned such that at each point in the rotation of said rotor portion there is at least one of said pole portions that is not aligned with any of said magnetically polarized zones of said rotor portion; and
    electrical power and control means for operating said motor, including a phase A circuit and a phase B circuit, each connected to one half of said magnetic windings, wherein;
    the number of said pole portions is equal to the total number of said radially polarized zones, each said pole portion being a salient pole and said salient poles being wound such that alternating pairs of said salient poles constitute phase A North and South poles and phase B North and South poles.

2. The motor of claim 1 wherein
    said salient poles are formed of magnetically permeable material and discrete magnetically permeable innerpoles are interspersed between said salient poles.

3. The motor of claim 1 wherein
    said pairs of phase A North and South salient poles are situated circumferentially closer to other phase A pairs than are said pairs of phase B North and South salient poles to other phase B pairs.

4. The motor of claim 3 wherein
    each said pair of phase A North and South salient poles has a greater spacing between said North pole and said South pole than is present in a pair of said phase B North and South salient poles.

* * * * *